UNITED STATES PATENT OFFICE.

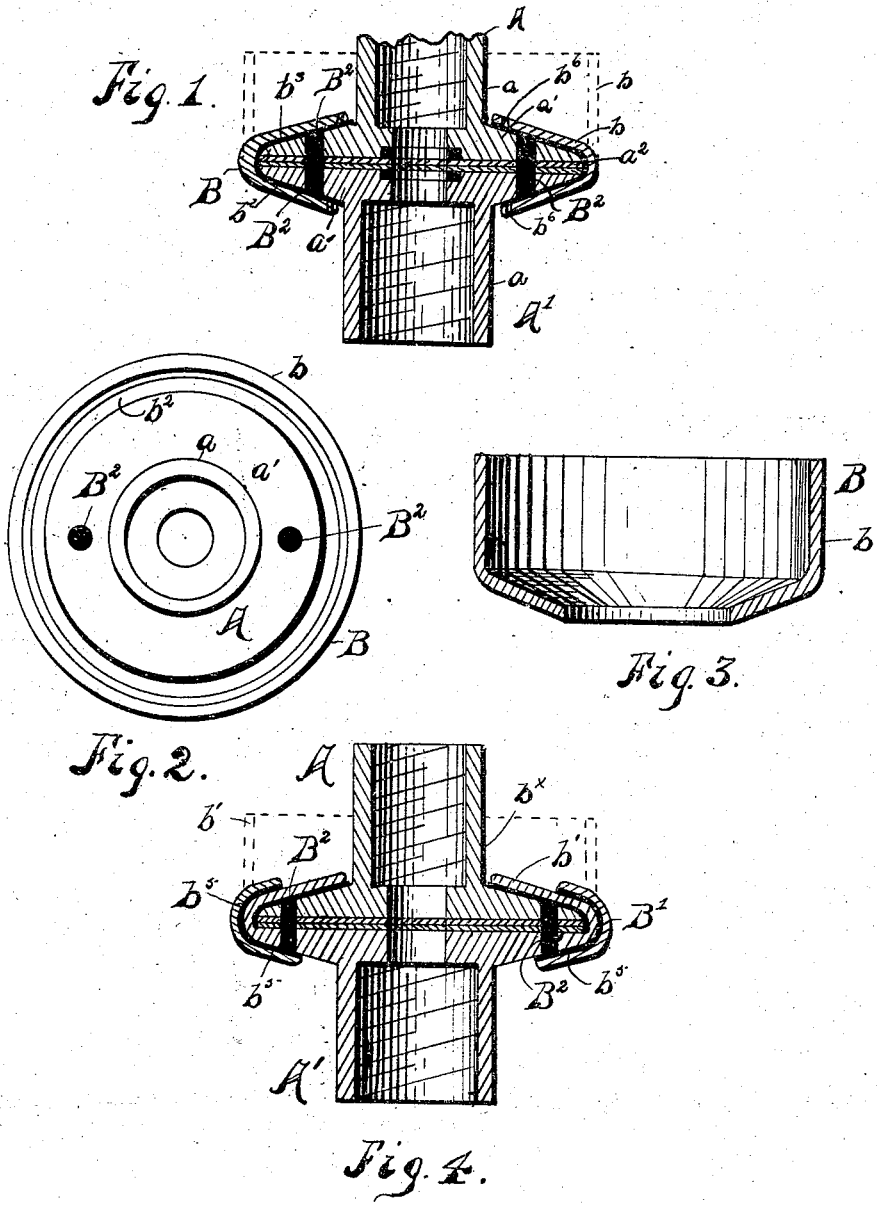

ELLIOTT P. GLEASON, OF BROOKLYN, ASSIGNOR TO THE E. P. GLEASON MANUFACTURING COMPANY, OF NEW YORK, N. Y.

INSULATING-JOINT.

SPECIFICATION forming part of Letters Patent No. 552,363, dated December 31, 1895.

Application filed December 27, 1894. Serial No. 533,075. (No model.)

*To all whom it may concern:*

Be it known that I, ELLIOTT P. GLEASON, a citizen of the United States, and a resident of Brooklyn, in the county of Kings and State of New York, have invented certain new and useful Improvements in Insulating-Joints, of which the following is a specification.

This invention relates to insulating-joints for gas and electric fixtures.

I will describe a joint embodying my invention and then point out the novel features in the appended claims.

In the accompanying drawings, Figure 1 is a longitudinal section of a joint embodying my invention. Fig. 2 is a plan view with certain parts omitted and indicating a certain part in an upright position or before being turned down into position. Fig. 3 is a sectional view of a part employed, and Fig. 4 is a longitudinal section showing a modification.

Referring by letter to the example shown in Fig. 1, the joint comprises two main portions A A'. Each portion has a tubular part, screw-threaded in its interior, for attachment to gas or other tubing, and an annular flange part $a'$. The portions A A' are insulated one from the other by an annulus of insulating material $a^2$. This insulating material, as well as all the other insulating material hereinafter mentioned, is preferably of mica.

B is a clamping device for securing the parts A A' together. This clamping device, a sectional view of which is shown in Fig. 3, has a perforated bottom portion adapted to engage around the flange of one of the joint portions, and it has an annular side wall $b$, adapted to be turned around the flange of the other portion, as shown in full line in Fig. 1, the dotted lines in said figure indicating the said wall of the clamping device.

In the modification shown in Fig. 4 the clamping device is formed integral with one of the joint portions and is turned upon the flange of the other portion, as shown at $b'$.

In Fig. 1 a washer $b^2$ of insulating material is interposed between the bottom of the clamping device and the flange of the joint portion A', and a similar washer $b^3$ is interposed between the wall $b$ and the flange of the joint portion A.

In Fig. 4 a washer $b^4$ of insulating material is interposed between the wall $b'$ and the joint portion A, and in this example, as a means to prevent short circuiting, a metal rim B' is turned over the outer edge of the fastening device and mica washers $b^5$ are interposed between the parts.

I provide means for preventing a rotary motion of the joint portions, one relatively to the other. This means consists of plugs or dowels $B^2$, of insulating material, extended through perforations in the flanges of the joint portions. Means have heretofore been employed for preventing this relative rotary movement—such, for instance, as undulating the faces of the joint portions or providing them with transverse shoulders. These methods are objectionable for the reason that the uneven surfaces are apt to break the mica and leave unprotected parts between the joint portions, and, further, as these joint portions are turned in a lathe, the undulating or shouldering of the parts involves extra labor and expense. In my improvement the faces of the flanges are at right angles to the tubular portions, and therefore may be easily turned true in a lathe.

As a means to prevent bridging between the interior adjacent surfaces of the joint portions by gas, tar, or similar sediment, I place small rings or washers $b^6$ in depressions formed in the flanged ends of the joint portions, as shown in Fig. 1.

Having described my invention, what I claim is—

1. In an insulating coupling the combination of two tubular and flanged portions, the faces of said flanged portions being at substantially right angles to the length of the tubular portions, a fastening device, consisting of a ring on the outside of the flanges and covering them and the plugs, the insulating material and plugs of insulating material extended through holes in the flanges, substantially as specified.

2. The combination of the joint portions A, A', the insulating material, substantially as shown and described, and the plugs or dowels $B^2$, extended through holes in the flanges of the joint portions, none of said plugs extending beyond the sections to make electrical contact between either section and any object with which said plug might encounter, substantially as specified.

3. In an insulating coupling, two sections having perforated flanges secured together by a turned flange or ring and plugs of non-conducting material extending into the holes in the sections, and insulating material disposed as set forth, as and for the purposes specified.

4. In an insulating coupling, two sections having holes and flanges, in combination with plugs of insulating material locking the sections against turning and contacting non electrically with both sections and a neutral ring covering the plugs and holding the sections together as set forth.

5. In an insulating joint, the combination of two flanged sections, each flange having a portion cut away, in combination with sections or plugs of non-conducting material, extending from one section to the other and abutting against the sections and extending into the depressions formed by cutting the sections away, said non-conducting material being of sufficient tensile strength to resist the usual strain to which the couplings are subjected to prevent turning of the sections upon each other and a separate and independent clamp for holding the sections together, substantially as described.

6. In an insulating joint, the combination of two flanged sections, each flange having a portion cut away; in combination with sections or plugs of non-conducting material, extending from one section to the other and abutting against the sections and extending into the depressions formed by cutting the sections away, said non-conducting material being of sufficient tensile strength to resist the usual strain to which the couplings are subjected to prevent turning of the sections upon each other and a separate and independent clamp embracing the flanges of the sections and insulated from them, substantially as described.

7. In an insulating joint, the combination of two flanged sections, each flange having a portion cut away; in combination with sections or plugs of non-conducting material, extending from one section to the other and abutting against the sections and extending into the depressions formed by cutting the sections away, said non-conducting material being of sufficient tensile strength to resist the usual strain to which the couplings are subjected to prevent turning of the sections upon each other and a separate and independent clamp embracing the flanges of the sections and insulated from them and covering and protecting the plugs and the flanges of the sections, substantially as described.

Signed at New York, in the county of New York and State of New York, this 29th day of June, A. D. 1894.

ELLIOTT P. GLEASON.

Witnesses:
   CLARENCE R. FERGUSON,
   WM. L. BENNEM.